United States Patent
Okada et al.

(10) Patent No.: US 7,233,719 B2
(45) Date of Patent: Jun. 19, 2007

(54) DISPERSION SLOPE COMPENSATOR

(75) Inventors: Hideo Okada, Kawasaki (JP); Shinichi Wakana, Kawasaki (JP); Yasuhiro Yamauchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 8 days.

(21) Appl. No.: 11/320,342

(22) Filed: Dec. 29, 2005

(65) Prior Publication Data

US 2006/0215286 A1 Sep. 28, 2006

(30) Foreign Application Priority Data

Mar. 28, 2005 (JP) ............................. 2005-091953

(51) Int. Cl.
*G02B 6/26* (2006.01)
*G02B 5/10* (2006.01)
*H04J 14/02* (2006.01)

(52) U.S. Cl. ............................. 385/24; 385/15; 385/33; 398/81; 359/589; 359/872

(58) Field of Classification Search ............... 385/15, 385/24, 27, 33, 37; 398/81, 88; 359/578, 359/584, 589, 615, 871–874, 876
See application file for complete search history.

(56) References Cited

U.S. PATENT DOCUMENTS

| 6,343,866 | B1 | 2/2002 | Cao et al. |
| 6,646,805 | B2 | 11/2003 | Mitamura et al. |
| 6,810,171 | B2 * | 10/2004 | Zhou et al. ............. 385/24 |
| 2003/0035608 | A1 * | 2/2003 | Zhang et al. ............. 385/15 |
| 2003/0185504 | A1 | 10/2003 | Yamauchi et al. |
| 2004/0101237 | A1 * | 5/2004 | Cao ............................. 385/27 |
| 2005/0213215 | A1 | 9/2005 | Mitamura et al. |

FOREIGN PATENT DOCUMENTS

| EP | 1 237 308 A2 | 9/2002 |
| EP | 1 237 308 A3 | 9/2004 |
| JP | 2002-258207 | 9/2002 |
| JP | 2003/294999 | 10/2003 |

OTHER PUBLICATIONS

European Search Report in corresponding Patent Application No. 050286350-2216 dated Jul. 14, 2006.

* cited by examiner

*Primary Examiner*—Hemang Sanghavi
(74) *Attorney, Agent, or Firm*—Staas & Halsey LLP (57) ABSTRACT

In a dispersion slope compensator of the invention, angular dispersion of a WDM light in which the angular dispersion is already performed in a first direction (Y-axis) with a VIPA plate is performed in a second direction (X'-axis) perpendicular to the first direction with a diffraction grating, and the WDM light is reflected from a three-dimensional mirror and returned to the VIPA plate side. At this point, the three-dimensional mirror is mounted on a rotating stage while placed on a linear-moving stage, which moves the three-dimensional mirror in parallel in the second direction. Thereby, the rotating stage can adjust an angle of a reflection plane of the three-dimensional mirror with respect to an optical axis of the light focused with a lens, which allows optical axis shift of the reflected light to be corrected in the three-dimensional mirror according to setting of a chromatic dispersion compensation amount. Accordingly, chromatic dispersion compensation and dispersion slope compensation can be realized over a wide signal band.

7 Claims, 6 Drawing Sheets

RELATED ART

FIG.7

RELATED ART

FIG.8

RELATED ART

FIG.9

RELATED ART

FIG.10

RELATED ART

FIG.11

RELATED ART

FIG.12

RELATED ART

DISPERSION SLOPE COMPENSATOR

BACKGROUND OF THE INVENTION

1. Field of the Invention

The present invention relates to a dispersion slope compensator for compensating chromatic dispersion and dispersion slope which are generated in signal lights having wavelengths transmitted through an optical fiber in wavelength division multiplexing (WDM) type optical communication.

2. Related Art

In an optical fiber communication system, because propagation waveform distortion caused by the wavelength dispersion (chromatic dispersion) of the optical fiber generally decreases signal quality, it is necessary to prevent the decrease in signal quality by utilizing the chromatic dispersion compensator and the like. For example, the conventional chromatic dispersion compensator includes one in which a so-called Virtually Imaged Phased Array (VIPA) is utilized (For example, see Japanese Patent Application Laid-Open (JP-A) No. 2003-294999). VIPA branches the light signal in plural light fluxes, which can spatially be identified (for example, traveling in different directions) according to the wavelengths.

Figure 6:
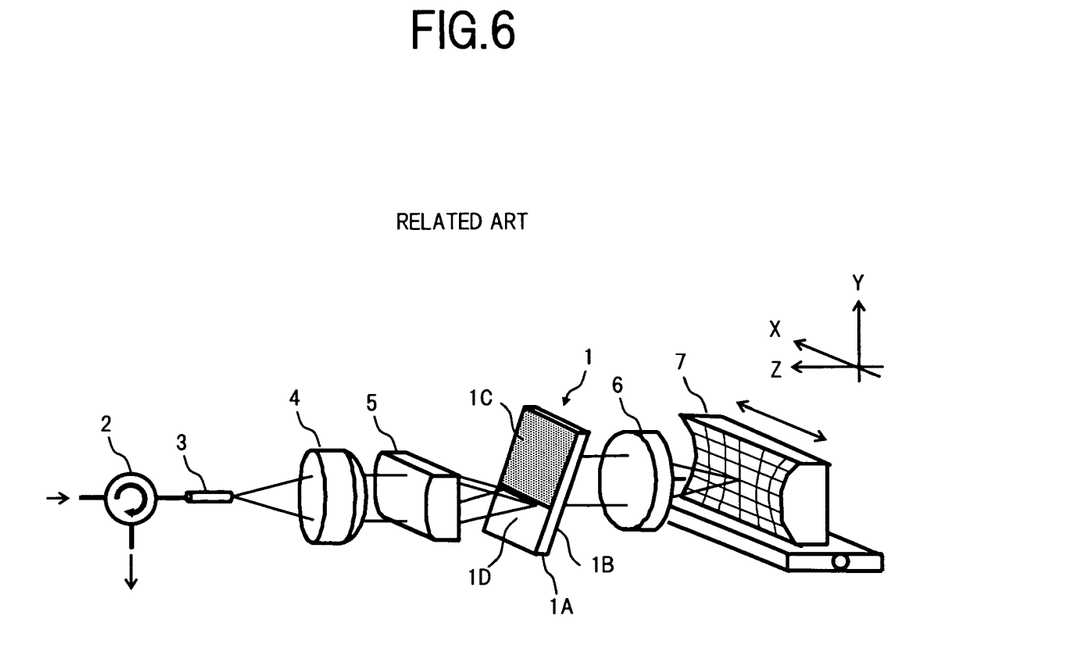
FIG. 6 is a perspective view showing a configuration example of the conventional VIPA type chromatic dispersion compensator.
Figure 7:
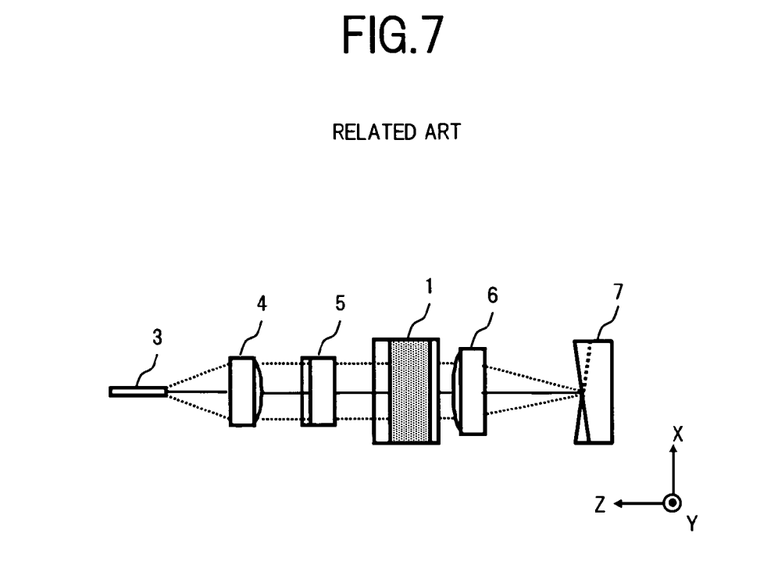
FIG. 7 is a top view of the configuration example shown in FIG. 6.

The conventional VIPA type chromatic dispersion compensator will briefly be described below. FIG. 6 is a perspective view showing a configuration example of the conventional VIPA type chromatic dispersion compensator. FIG. 7 is a top view of the configuration example shown in FIG. 6.

As shown in the drawings, in the conventional VIPA type chromatic dispersion compensator, for example, after an outgoing light from an optical fiber 3 through an optical circulator 2 is converted into parallel light with a collimating lens 4, the light is focused onto one line segment with a cylindrical lens 5, and the light is incident to a space between parallel planes opposing to each other through a light entrance window 1D of a VIPA plate 1. The light incident to the VIPA plate 1 performs repeatedly multiple-reflection between a reflection multilayer film 1B and a reflection multilayer film 1C. The reflection multilayer film 1B is formed on one of planes of a substrate 1A, and the reflection multilayer film 1B has reflectance lower than 100%. The reflection multilayer film 1C is formed on the other plane, and the reflection multilayer film 1C has the reflectance of about 100%. At this point, the several-percent light is transmitted through the reflection plane and outputted to the outside of the VIPA plate 1 in each reflection on the surface of the reflection multilayer film 1B.

The lights transmitted through the VIPA plate 1 interfere with one another to form plural light fluxes having the different traveling directions according to the wavelengths. As a result, when the light fluxes are focused on one point with a lens 6, the focusing position of each light flux is moved on a straight line according to a change in wavelength. The lights, outputted from the VIPA plate 1 and focused with the lens 6, are reflected at different positions on a three-dimensional mirror 7 according to the wavelengths and returned to the VIPA plate 1 by arranging the three-dimensional mirror 7. The lights reflected from the three-dimensional mirror 7 travel in the different directions depending on the wavelength, and optical paths of the lights are shifted when the lights are returned to the VIPA plate 1. The different wavelength components propagate through different distances by changing the optical path shift amount according to the wavelengths, which performs the chromatic dispersion compensation of the input light. The three-dimensional mirror 7 is moved in parallel in a direction (X-axis direction of the drawings) perpendicular to an angular dispersion direction (Y-axis direction of the drawings) in the VIPA plate 1, and a curvature is changed in the Y-axis direction of the reflection plane of the three-dimensional mirror 7 to which the light transmitted through the lens 6 is incident. Thereby, a chromatic dispersion compensation amount becomes variable.

Figure 8:
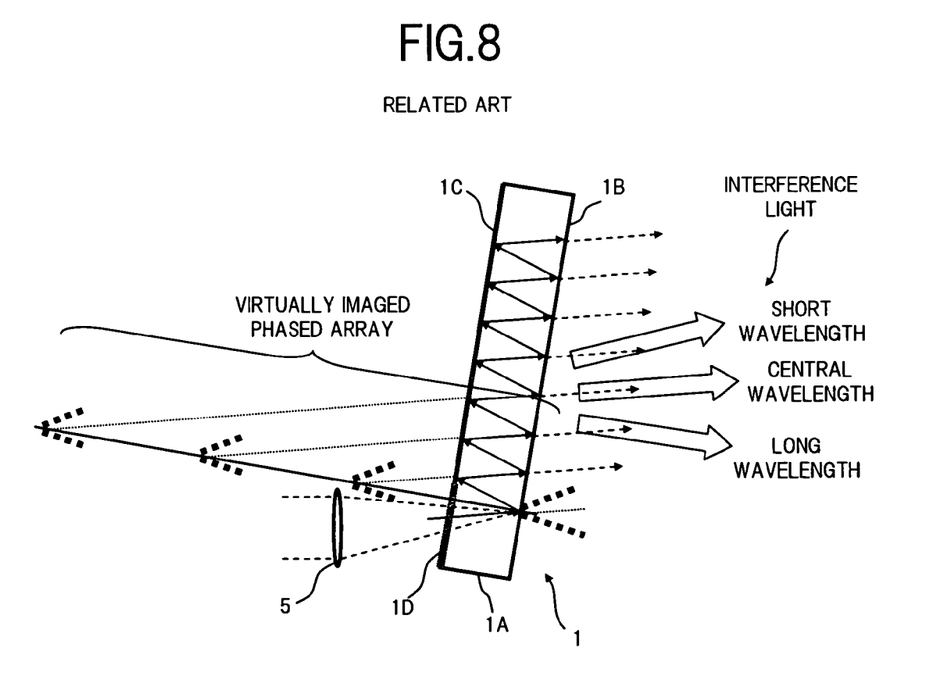
FIG. 8 is a view showing a model for explaining an operation principle of VIPA.

Thus, when a model shown in FIG. 8 is considered, behavior of the light in which the multiple-reflection is performed with the VIPA plate 1 is similar to the light in a well-known Echelon grating, which is of a step-shaped diffraction grating. Thereby, it can be considered that the VIPA plate 1 is a virtual diffraction grating. In consideration of interference conditions at the VIPA plate 1, as shown in right side of FIG. 8, upper sides of the outgoing lights interfere on the condition of a short wavelength based on an optical axis basis and lower sides interfere on the condition of a long wavelength, so that short wavelength components of the light signals having the wavelengths are outputted on the upper side and long wavelength components are outputted on the lower side. In the conventional VIPA type chromatic dispersion compensator, there are advantages that the chromatic dispersion can be compensated over a wide range, and the wavelength (transmission wavelength) of the light signal to be compensated can be changed by temperature control of the VIPA plate 1 and the like.

In a transmission system of the wavelength division multiplexing (WDM) light including the plural light signal beams having the different wavelengths, it is necessary that the chromatic dispersion compensation is appropriately performed to the light signals having the wavelengths, sometimes it is necessary to compensate a chromatic dispersion wavelength dependent property called dispersion slope. Thereby, an apparatus (hereinafter referred to as dispersion slope compensator), which can compensate the chromatic dispersion and the dispersion slope, is required.

Figure 9:
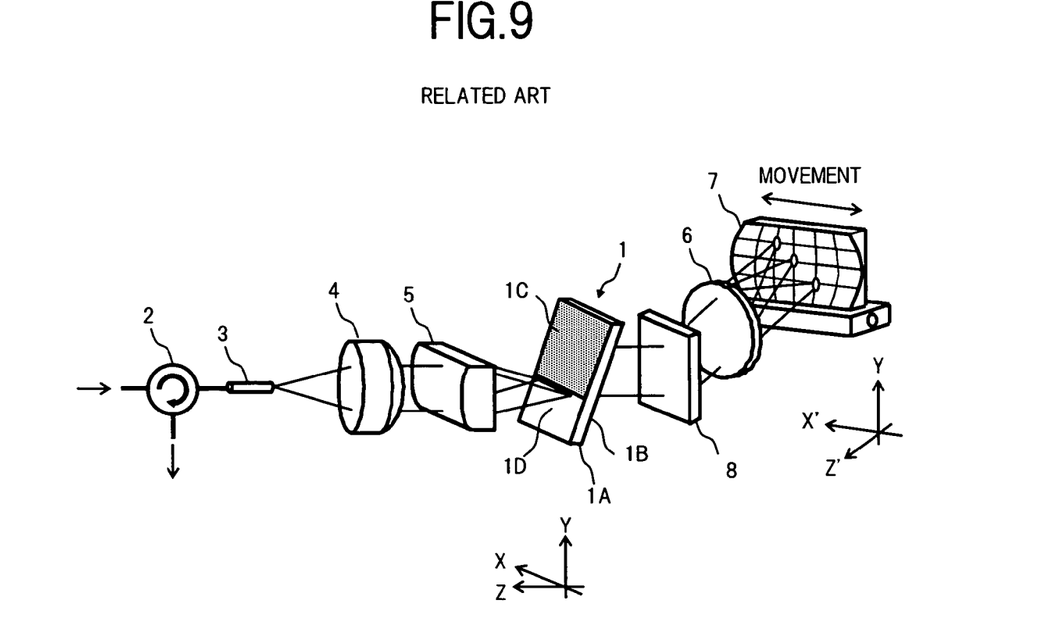
FIG. 9 is a perspective view showing a configuration example of the conventional dispersion slope compensator.
Figure 10:
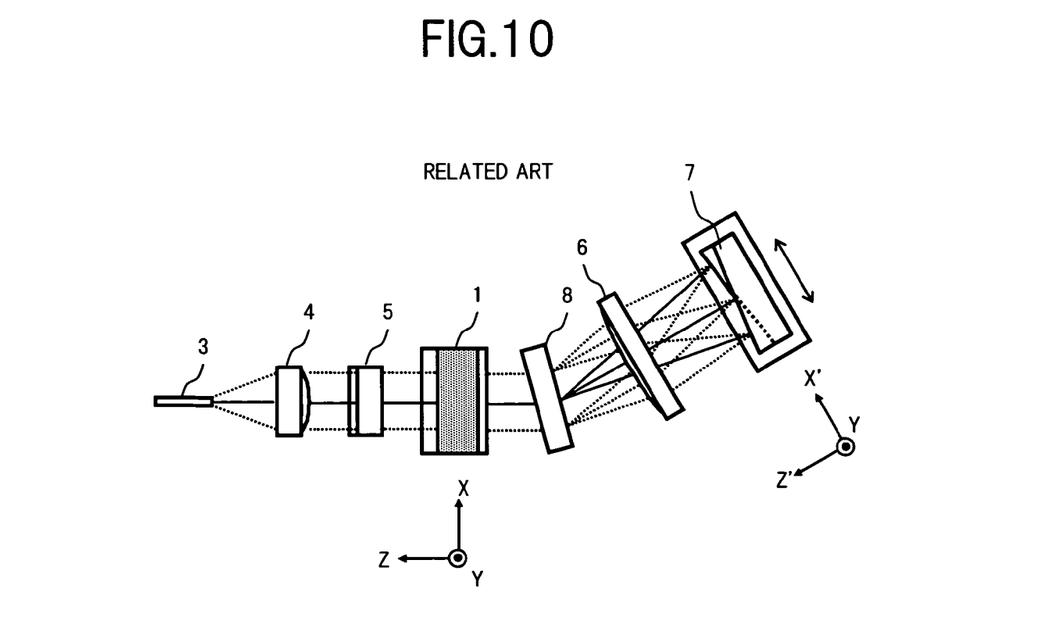
FIG. 10 is a top view of the configuration example shown in FIG. 9.

Various configurations have been proposed in the conventional dispersion slope compensator (for example, see JP-A No. 2002-258207 and U.S. Pat. No. 6,343,866). For example, as shown in FIGS. 9 and 10, the chromatic dispersion and the dispersion slope which are imparted to light signals having the wavelengths of the WDM light can be separately controlled by providing means 8 (for example, diffraction grating and hologram) in the above VIPA type chromatic dispersion compensator. In accordance with the wavelength, the means 8 generates the optical path shift in parallel in the direction (X'-axis direction of the drawings) perpendicular to the angular dispersion direction (Y-axis direction) with respect to the lights having the wavelength to which the angular dispersion is performed with the VIPA plate 1.

However, for the conventional dispersion slope compensator, the angular dispersion of the lights having the wavelength to which the angular dispersion is performed with the VIPA plate 1 is performed in the X'-axis direction with the diffraction grating and the like. Thereby, the optical axis shift of the reflected light in the X'-axis direction is easy to occur in the three-dimensional mirror 7, which results in a problem that return light loss to the optical fiber 3 is increased.

That is, in the three-dimensional mirror 7 used for the conventional dispersion slope compensator, because the reflection plane is gradually changed from a convex surface to a concave surface with respect to the X'-axis direction, the reflection plane in the X'-axis direction has inclination with respect to the optical axis (Z'-axis of FIGS. 9 and 10) of the light focused with the lens 6. Thereby, the light is not perpendicularly incident to the reflection plane of the three-dimensional mirror 7, and the optical axis shift is generated in the reflected light. Particularly, in the case where an absolute value of the chromatic dispersion compensation amount is set larger, because the optical axis shift of the reflected light is increased, the return light loss to the optical fiber 3 is increased, or the light is not returned.

Figure 11:
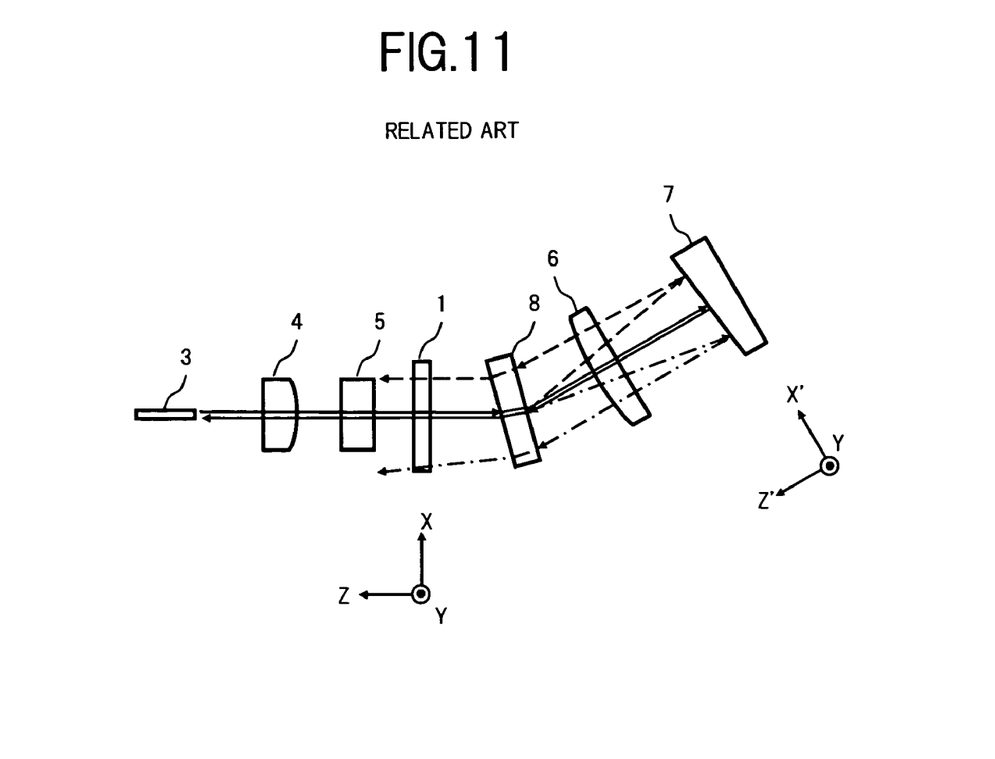
FIG. 11 is a sectional view for explaining optical path shift of the reflected light in the conventional dispersion slope compensator.

Specifically, as shown in FIG. 11, the optical axis (solid line) of an intermediate-wavelength light signal in the light signals having the plural wavelengths included in the input light becomes substantially perpendicular to the reflection plane of the three-dimensional mirror 7, so that the return light loss to the optical fiber 3 is small. On the contrary, the optical axis (broken line) of the light signal on the long wavelength side does not become perpendicular to the reflection plane of the three-dimensional mirror 7, so that the optical axis of the reflected light is largely shifted upward in FIG. 11 and the return light loss to the optical fiber 3 becomes larger.

The optical axis (alternate long and short dash line) of the light signal on the short wavelength side does not also become perpendicular the reflection plane of the three-dimensional mirror 7, so that the optical axis of the reflected light is shifted downward in FIG. 11 and the light is hardly returned to the optical fiber 3. In the sectional view of FIG. 11, although the inclination of the reflection plane of the three-dimensional mirror 7 is shown by the straight line, accurately the inclination of the reflection plane becomes a curved line corresponding to the curved shape of the reflection plane. Thereby, the optical axis shift of the reflected light corresponding to each wavelength is changed in a complicated manner by moving the three-dimensional mirror 7 parallelly in X'-axis direction.

Figure 12:
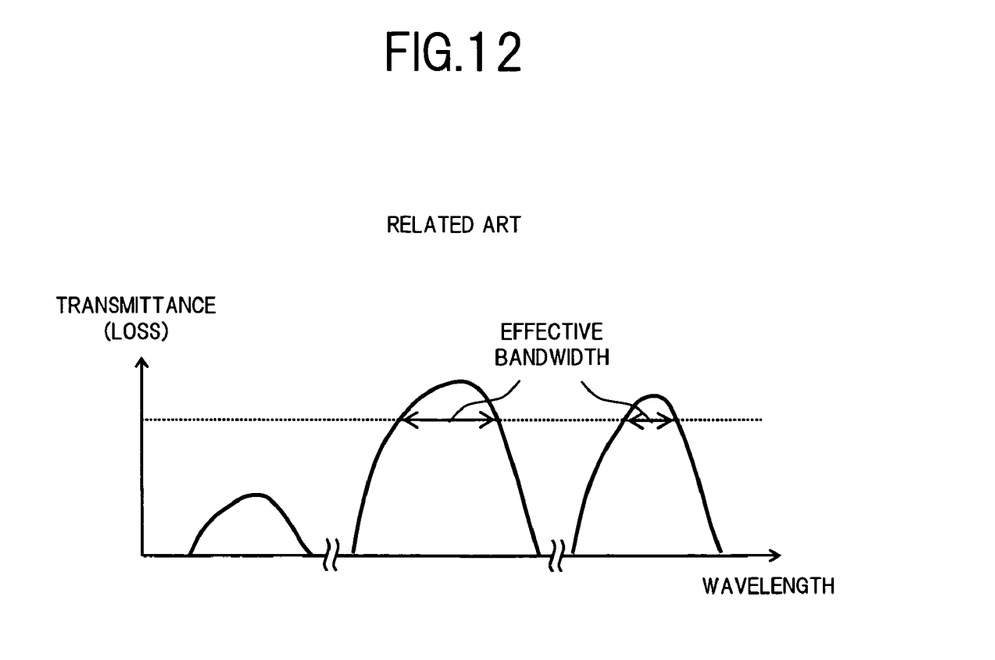
FIG. 12 is a view showing transmission (loss) wavelength characteristics in the conventional dispersion slope compensator.

FIG. 12 shows an example of transmission wavelength band periodically generated in the conventional dispersion slope compensator. As shown in FIG. 12, for the intermediate-wavelength light signal in the signal band of the inputted WDM light, the sufficient transmission band can be secured for the required transmittance (loss). However, for the light signals on the long and short wavelength sides, the effective transmission band cannot be secured due to the increase in loss. Thereby, the chromatic dispersion cannot be compensated.

In the conventional dispersion slope compensator, an arrangement (distance) of optical components between the three-dimensional mirror 7 and the diffraction grating and the like are not concretized. In order to decrease the increase in loss caused by the optical axis shift of the reflected light, it is necessary to optimize the optical arrangement.

SUMMARY OF THE INVENTION

In view of the foregoing, an object of the invention is to be able to realize the chromatic dispersion compensation and the dispersion slope compensation over a wide signal band by correcting optical axis shift of the reflected light to decrease return light loss according to the setting of the chromatic dispersion compensation amount for the dispersion slope compensator in which VIPA is utilized.

In order to achieve the above object, a dispersion slope compensator of the invention includes an optical system to which a wavelength division multiplexing light is inputted, the wavelength division multiplexing light including a plurality of light signals having different wavelengths, the optical system focusing the wavelength division multiplexing signal in a one-dimensional direction to output the wavelength division multiplexing light; an optical component which has two reflection planes parallel to each other, the wavelength division multiplexing light outputted from the optical system being incident to a space between the reflection planes, a part of the incident light being transmitted through one of the reflection planes while multiple-reflected from the reflection planes, the transmitted light being dispersed in a first direction at different angles according to wavelengths in each light signal of each wavelength included in the wavelength division multiplexing light by interference of the transmitted lights, the optical component outputting the dispersed light; angular dispersion means for dispersing the light having each wavelength outputted from the optical component at different angles according to the wavelengths with respect to a second direction perpendicular to the first direction; a lens which focuses the light of each wavelength outputted from the angular dispersion means; a three-dimensional mirror which has a reflection plane for reflecting the light of each wavelength focused with the lens, the reflection plane having a curved shape in which a curvature in the first direction is changed along the second direction; and a linear-moving stage which can move the three-dimensional mirror in the second direction in a parallel translation manner, the light of each wavelength focused with the lens being reflected at positions corresponding to chromatic dispersion compensation amounts on the reflection plane of the three-dimensional mirror respectively, the reflected lights being returned to the optical system through the lens, the angular dispersion means, and the optical component, wherein the dispersion slope compensator includes a rotating stage having a stage surface and an axis, the stage surface is perpendicular to said first direction and mounts the three-dimensional mirror being placed on the linear-moving stage, the axis is parallel to the first direction and is located at a position where an intermediate-wavelength light signal included in the wavelength division multiplexing light is focused with the lens, and the rotating stage can adjust an angle of the reflection plane of the three-dimensional mirror with respect to optical axes of the light of each wavelength focused with the lens by rotating the stage surface about the axis by a rotating angle according to the chromatic dispersion compensation amount.

In dispersion slope compensation, compensation of the above configuration, the optical component corresponds to the conventional VIPA, the optical component performs the angular dispersion to the WDM light outputted from the optical system in the first direction, and the angular dispersion means further performs the angular dispersion to the WDM light in the second direction. Then, the WDM light is focused with the lens and reflected from the three-dimensional mirror. The three-dimensional mirror is moved in parallel by the linear-moving stage in the second direction corresponding to the chromatic dispersion compensation amount, and the reflection plane angle (flap) is adjusted by the rotating stage with respect to the optical axes of the lights having the wavelengths focused with the lens. Thereby, in the three-dimensional mirror, the optical axis shift of the reflected light is corrected by optimizing the rotating angle of the rotating stage.

In the dispersion slope compensator of the invention, a distance between the angular dispersion means and the lens and a distance between the lens and the reflection plane of the three-dimensional mirror are configured to become a focal length of the lens respectively. Thereby, the lights having the wavelengths transmitted through the lens become the light beams, which are parallel to one another and substantially perpendicular to the second direction.

According to the dispersion slope compensator of the invention, since the optical axis shift of the reflected light can be corrected to decrease the return light loss according to the setting of the chromatic dispersion compensation amount, the chromatic dispersion and the dispersion slope can be compensated over a wide signal band.

The other objects, features, and advantages of the invention will become apparent from the following description of embodiments with reference to the accompanying drawings.

DETAILED DESCRIPTION OF THE INVENTION

A preferred embodiment of the invention will be described below with reference to the accompanying drawings. In the following drawings, the same numeral shall designate the same or corresponding component.

Figure 1:
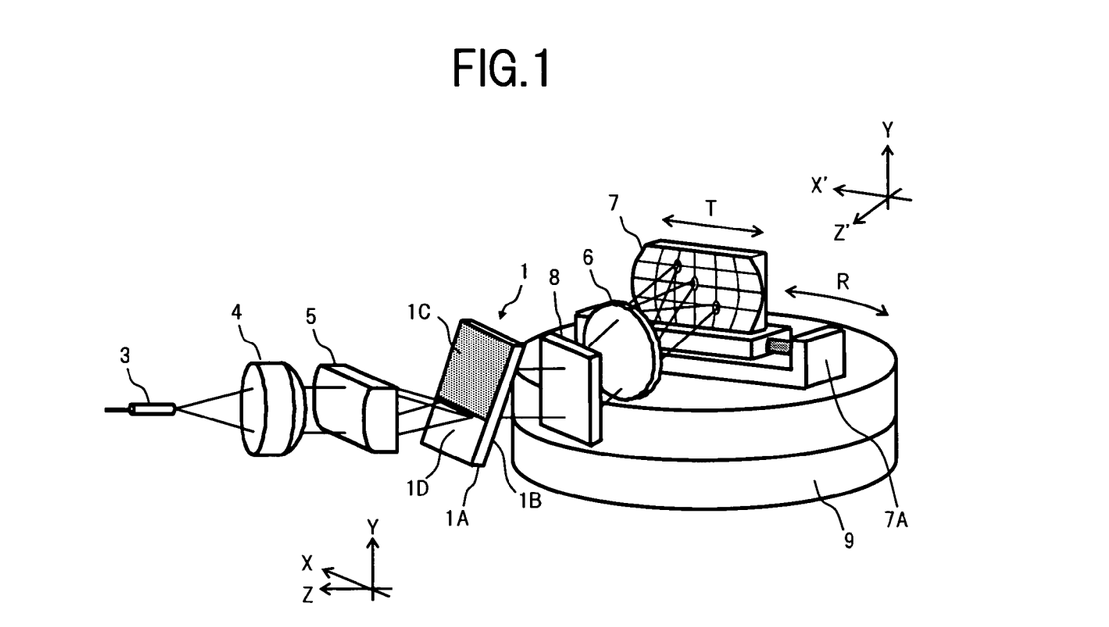
FIG. 1 is a perspective view showing a configuration of a dispersion slope compensator according to an embodiment of the invention.
Figure 2:
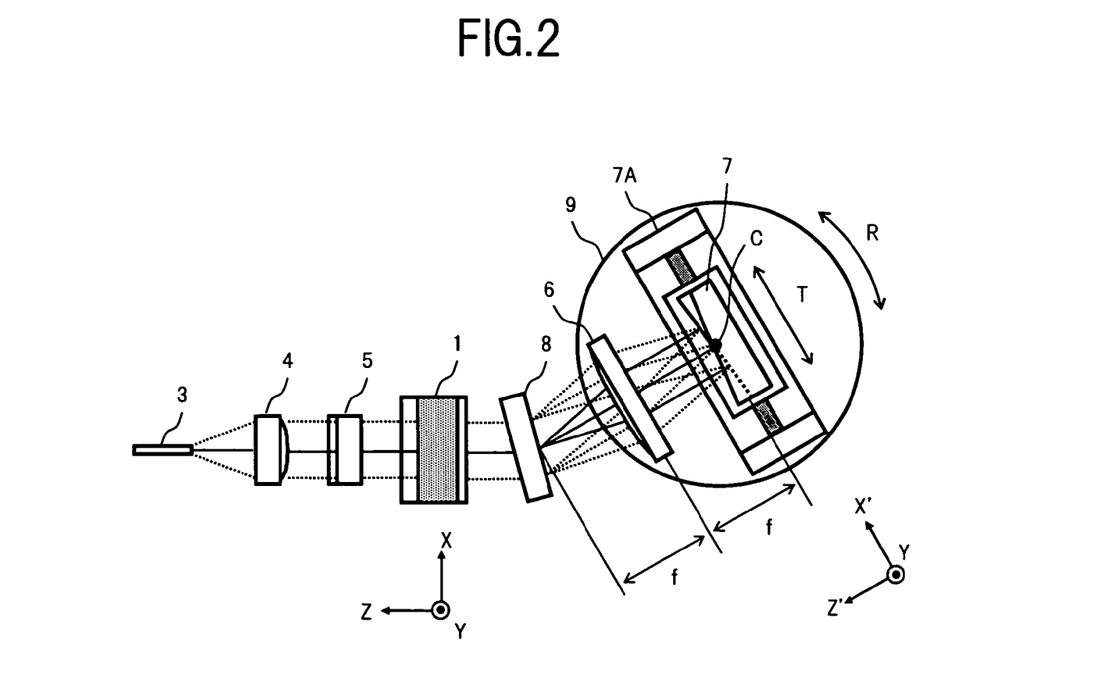
FIG. 2 is a top view of the configuration shown in FIG. 1.

FIG. 1 is a perspective view showing a configuration of a dispersion slope compensator according to an embodiment of the invention. FIG. 2 is a top view of the configuration shown in FIG. 1.

The dispersion slope compensator according to the embodiment shown in FIGS. 1 and 2 differs from the dispersion slope compensator shown in FIGS. 9 and 10 in the following points. That is, the three-dimensional mirror 7 is mounted on a rotating stage 9 which is rotatable about an axis C parallel to the angular dispersion direction (Y-axis direction) in the VIPA plate 1, and the lens 6, the three-dimensional mirror 7, and the diffraction grating 8 are arranged such that the distance between the diffraction grating 8 and the lens 6 and the distance between the lens 6 and the reflection plane of the three-dimensional mirror 7 become a focal length f of the lens 6 respectively. The configurations other than those above are basically similar to the conventional dispersion slope compensator. Each component of the dispersion slope compensator of the embodiment will be described below.

The VIPA plate 1 includes the substrate 1A, the reflection multilayer film 1B, the reflection multilayer film 1C, and the light entrance window 1D. The substrate 1A has parallel planes opposing to each other. The reflection multilayer film 1B is formed on one of the parallel planes of the substrate 1A, and the reflection multilayer film 1C is formed on the other parallel plane. The VIPA plate 1 is inclined by a required angle with respect to an angle at which the optical axis of the WDM light incident to the light entrance window 1D becomes normal incidence. The reflection multilayer film 1B has reflectance lower than 100% (preferably range of about 95% to 98%) with respect to the WDM light incident from the light entrance window 1D. The reflection multilayer film 1B is formed on a whole area of one of the planes of the substrate 1A. The reflection multilayer film 1C substantially has reflectance of 100% with respect to the WDM light incident from the light entrance window 1D. The reflection multilayer film 1C is partially formed on the other plane of the substrate 1A. In the other plane of the substrate 1A, a portion where the reflection multilayer film 1C is not formed becomes the light entrance window 1D which is transparent to the WDM light.

In the optical fiber 3, one end of a single-mode fiber or the like is connected to the optical circulator or the like (not shown in the embodiment, see FIG. 9), and the other end is arranged near the collimating lens 4. However, the type of the optical fiber 3 is not limited to those described above.

The collimating lens 4 a general lens which converts the outgoing light beam from the optical fiber 3 into the parallel light to impart the parallel light to cylindrical lens 5.

The cylindrical lens 5 is a line focusing lens which focuses the parallel light from the collimating lens 4 in a one-dimensional direction. The light focused on one line segment by the cylindrical lens 5 is incident to the space between the parallel planes from the light entrance window 1D of the VIPA plate 1.

The Z-axis direction in an orthogonal coordinate system X-Y-Z shown in the drawings coincides with the optical axis direction of the outgoing light from the optical fiber 3. In this case, the optical fiber 3, the collimating lens 4, and the cylindrical lens 5 are separately provided. However, a lens-equipped optical fiber in which these optical components are integrated may be used.

The diffraction grating 8 functions as angular dispersion means. That is, the diffraction grating 8 diffracts the light, which is outputted from the VIPA plate 1 to travel in the different directions according to the wavelengths, toward the horizontal direction with respect to the plane (X-Z plane) perpendicular to the angular dispersion direction of the VIPA plate 1. Then, the diffraction grating 8 disperses light signal of each wavelength (channel) included in the WDM light at different output angles according to the wavelengths.

An orthogonal coordinate system X'-Y'-Z' shown in the drawings is one in which the above Z-axis is transformed into a Z'-axis corresponding to a diffraction angle of the diffraction grating 8, the X-Z plane is parallel to X'-Z' plane.

The lens 6 is a general focusing lens, which focuses the light transmitted through the diffraction grating 8 onto one point in each wavelength. The lens 6 is arranged at a position on the optical path between the diffraction grating 8 and the three-dimensional mirror 7 such that the distance between the lens 6 and the diffraction grating 8 and the distance between the lens 6 and the three-dimensional mirror 7 become the focal length f respectively.

In order that the chromatic dispersion imparted to the light signal of each channel can arbitrarily be set in the dispersion slope compensator of the embodiment, the three-dimensional mirror 7 has a three-dimensional structure in which the cross-sectional shape of the reflection plane is gradually changed from a concave surface to a flat surface and further gradually change from the flat surface to a convex surface in the X'-axis direction perpendicular to the angular dispersion direction (Y-axis direction). The three-dimensional mirror 7 is mounted on a linear-moving stage 7A. The linear-moving stage 7A can move the three-dimensional mirror 7 in a parallel translation manner (arrow T in the drawings) in the X'-axis direction. The linear-moving stage 7A is similar to one which is used in order to move the three-dimensional mirror 7 in the conventional dispersion slope compensator.

In the rotating stage 9, the three-dimensional mirror 7 mounted on the linear-moving stage 7A is mounted on a stage surface perpendicular to the Y-axis direction. The rotating stage 9 can freely be rotated about the axis C parallel to the Y-axis (arrow R in the drawings). The position of the central axis C is set so as to coincide with the position onto which the intermediate-wavelength light signal of the WDM light inputted to the dispersion slope compensator of the embodiment is focused by the lens 6 (see FIG. 2). Thereby, the reflection plane angle (flap) of the three-dimensional mirror 7 can be adjusted without the effect of the movement of the linear-moving stage 7A by setting the central axis C at the position.

Then, the action of the embodiment will be described.

In the dispersion slope compensator having the above configuration, the WDM light which propagates through an optical fiber transmission line to generate the chromatic dispersion is sent to the optical fiber 3 through the optical circulator and the like. After the outgoing WDM light from the optical fiber 3 is converted into the parallel light by the collimating lens 4, the WDM light is focused on one line segment by the cylindrical lens 5, and the WDM light is incident to the substrate 1A through the light entrance window 1D of the VIPA plate 1. The WDM light incident to the VIPA plate 1 is repeatedly multiple-reflected between the reflection multilayer films 1B and 1C formed on the parallel planes of the substrate 1A. The several-percent WDM light is transmitted through the reflection plane in each time when the WDM light is reflected from the surface of the reflection multilayer film 1B, and the transmitted light is outputted to the outside of the VIPA plate 1.

The outgoing lights from the side of the reflection multilayer film 1B of the VIPA plate 1 interfere with one another. Thereby, plural light fluxes which traveling directions are different from one another depending on the wavelengths are formed in each light signal of the wavelength (channel) included in the WDM light, which allows the angular dispersion to occur in the Y-axis direction. Each light flux is incident to the diffraction grating 8 and diffracted in the horizontal direction with respect to the X-Z plane, and the light signals of the channels in which the angular dispersion occurs in the X'-axis direction are outputted. The lights transmitted through the diffraction grating 8 are focused at different positions by the lens 6, and the lights are reflected by the three-dimensional mirror 7.

At this point, as with the conventional dispersion slope compensator, the position in the X'-axis direction of the three-dimensional mirror 7 is adjusted by the linear-moving stage 7A such that the required chromatic dispersion is imparted to the light signal of each channel. In addition, in the embodiment, the reflection plane angle adjustment (flap adjustment) of the three-dimensional mirror 7 for the optical axis of the light focused by the lens 6 is performed by the rotating stage 9 according to the setting of the chromatic dispersion compensation amount.

Figure 3:
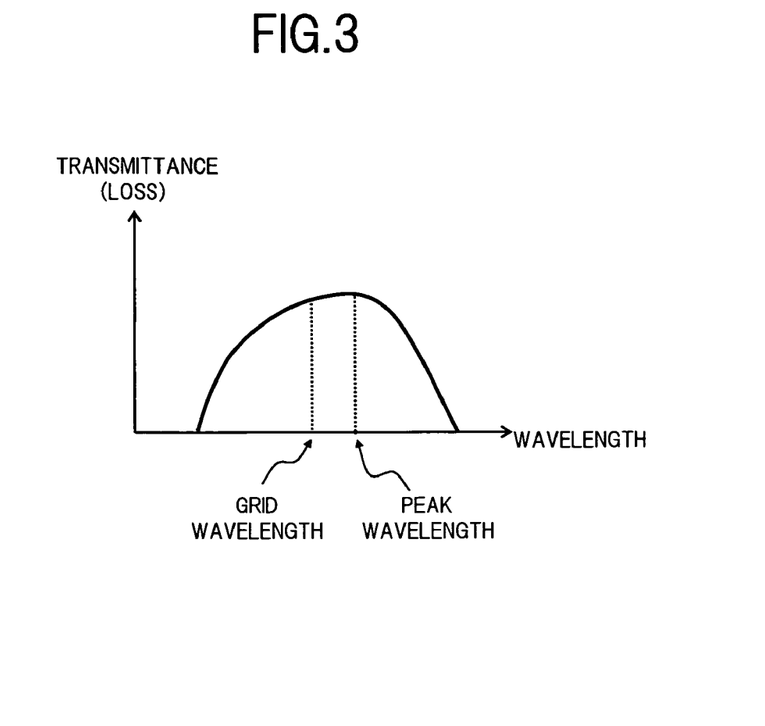
FIG. 3 is a view for explaining an example of angel adjustment of a three-dimensional mirror with a rotating stage in the embodiment.

Specifically, for example as shown in FIG. 3, the reflection plane angle adjustment of the three-dimensional mirror 7 with the rotating stage 9 is realized by optimally designing a rotating angle of the rotating stage 9 such that loss of return light to the optical fiber 3 becomes the minimum (or transmittance becomes the maximum) for a peak wavelength of at least one of the plural light signals included in the WDM light. When the WDM light in which the light signals of the channels are arranged according to a predetermined wavelength grid (for example, ITU grid) is the compensation target, the rotating angle of the rotating stage 9 may be optimally designed such that the loss becomes the minimum based on the grid wavelength.

Figure 4:
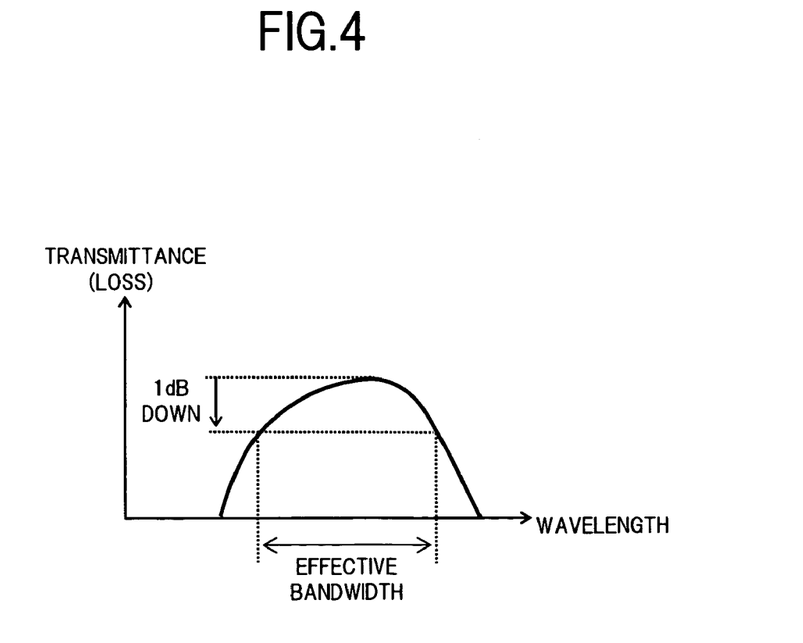
FIG. 4 is a view for explaining another example the angel adjustment of the three-dimensional mirror with the rotating stage in the embodiment.

For example, as shown in FIG. 4, it is also possible that the rotating angle of the rotating stage 9 is optimally designed such that an effective bandwidth at 1 dB down width becomes the maximum. The 1 dB down width is the width of the bandwidth when the transmittance is decreased from the maximum value by 1 dB.

In the dispersion slope compensator of the embodiment, the arrangement of each optical component is designed such that the distance between the diffraction grating 8 and the lens 6 is equal to the distance between the lens 6 and the reflection plane of the three-dimensional mirror 7, i.e., the focal length f of the lens 6. Thereby, the light signals of the channels which is transmitted through the lens 6 and incident to the three-dimensional mirror 7 become the light beams which are parallel to one another and substantially perpendicular to the X'-axis direction.

Figure 5:
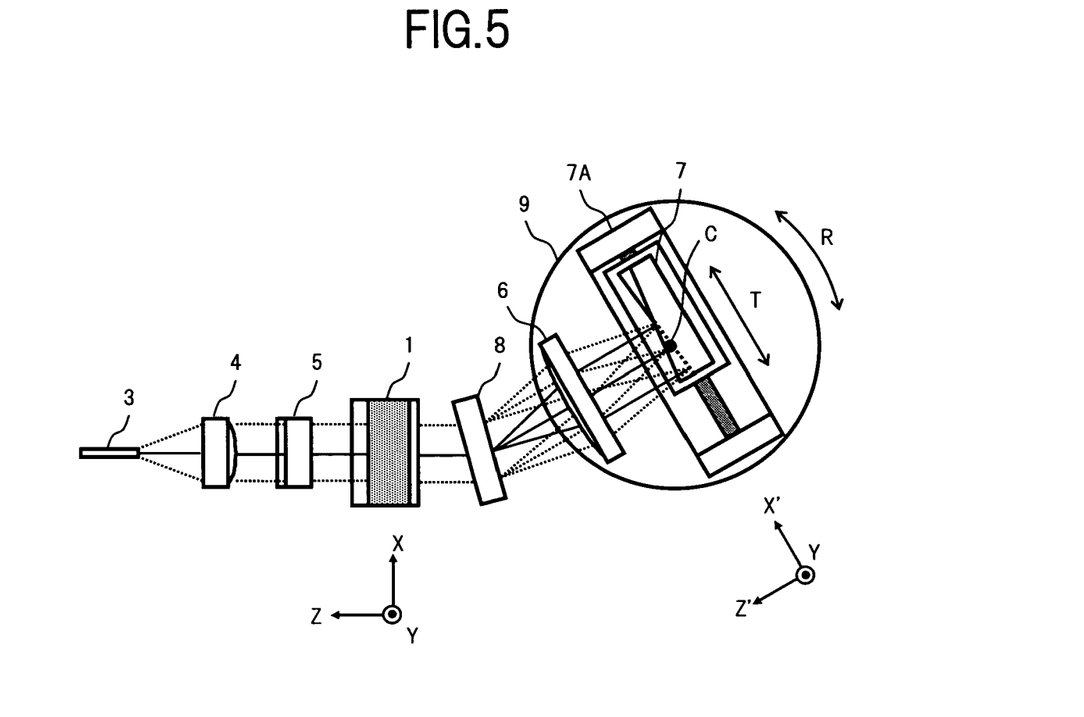
FIG. 5 is a top view illustrating an optical path of reflected light when the three-dimensional mirror is moved in the embodiment.

As described above, the reflection plane angle adjustment of the three-dimensional mirror 7 with the rotating stage 9 and the optimal design of the optical arrangement between the diffraction grating 8 and the three-dimensional mirror 7 suppress the optical axis shift of the reflected light of each channel to the minimum in the three-dimensional mirror 7, for example, even if the three-dimensional mirror 7 is moved toward the upper-left direction of the drawing by the linear-moving stage 7A in order to impart the chromatic dispersion having the large absolute value to the light signal of each channel as shown in the top view of FIG. 5.

In the light signal of each channel reflected from the three-dimensional mirror 7, each wavelength component travels in the different direction according to the curved shape of the reflection plane of the three-dimensional mirror 7, and the different wavelength component propagates through the different distance when the wavelength component is returned to the VIPA plate 1. Thereby, the required chromatic dispersion is imparted to the light signal of each channel. The light signal of each channel returned to the VIPA plate 1 is coupled to the optical fiber 3 with low loss through the cylindrical lens 5 and the collimating lens 4, and the light signal is outputted to the outside of the dispersion slope compensator of the embodiment through the optical circulator and the like.

Thus, according to the dispersion slope compensator of the embodiment, the three-dimensional mirror 7 mounted on the linear-moving stage 7A is mounted on the rotating stage 9, and the rotating mechanism is provided while having the center of the axis C located on the light signal focusing position of the intermediate wavelength of the WDM light. Thereby, the optical axis shift of the reflected light, caused by the inclination of the reflection plane of the three-dimensional mirror 7 in the X'-axis direction, can be corrected to decrease the return light loss to the optical fiber 3. Further, the return light loss to the optical fiber 3 can be decreased more effectively by applying the specific optical arrangement in which the distance between the diffraction grating 8 and the lens 6 and the distance between the lens 6 and the reflection plane of the three-dimensional mirror 7 become the focal length f of the lens 6 respectively. Accordingly, the chromatic dispersion compensation and the dispersion slope compensation can be realized for the WDM light having the wide signal band.

The configuration example, in which the angle adjustment of the three-dimensional mirror 7 with the rotating stage 9 and the optimal design of the optical arrangement between the diffraction grating 8 and the three-dimensional mirror 7, are combined, is shown in the above embodiment. However, only the angle adjustment of the three-dimensional mirror 7 with the rotating stage 9 can have the effect of decreasing the return light loss to the optical fiber 3.

In the embodiment, the rotating angle of the rotating stage 9 is optimally designed according to the chromatic dispersion compensation amount. However, for example, feedback control of the rotating angle of the rotating stage 9 may be performed by utilizing an optical spectrum analyzer or the like to monitor the return light to the optical fiber 3 such that the loss becomes the minimum at the peak wavelength or the grid wavelength of the light signal or such that the effective bandwidth becomes the maximum. Thereby, the return light loss to the optical fiber 3 can be decreased more securely.

Although the configuration example in which the angular dispersion of the light signal of each wavelength is performed in the X'-axis direction with the diffraction grating 8 is shown in the embodiment, the angular dispersion means of the invention is not limited to the configuration example of the embodiment. The angular dispersion means may be configured to cause the light dispersion angle to be variable to correspond to dispersion slope variable compensation.

What is claimed is:

1. A dispersion slope compensator comprising:
   an optical system to which a wavelength division multiplexing light is inputted, the wavelength division multiplexing light including a plurality of light signals having different wavelengths, said optical system focusing the wavelength division multiplexing signal in a one-dimensional direction to output the wavelength division multiplexing light;
   an optical component which has two reflection planes parallel to each other, the wavelength division multiplexing light outputted from said optical system being incident to a space between said reflection planes, a part of the incident light being transmitted through one of the reflection planes while multiple-reflected from said reflection planes, the transmitted light being dispersed in a first direction at different angles according to wavelengths in each light signal of each wavelength included in said wavelength division multiplexing light by interference of the transmitted lights, said optical component outputting the dispersed light;
   angular dispersion means for dispersing the light having each wavelength outputted from said optical component at different angles according to the wavelengths with respect to a second direction perpendicular to said first direction;
   a lens which focuses the light of each wavelength outputted from said angular dispersion means;
   a three-dimensional mirror which has a reflection plane for reflecting the light of each wavelength focused with said lens, the reflection plane having a curved shape in which a curvature in said first direction is changed along said second direction; and
   a linear-moving stage which can move said three-dimensional mirror in said second direction in a parallel translation manner, the light of each wavelength focused with said lens being reflected at positions corresponding to chromatic dispersion compensation amounts on the reflection plane of said three-dimensional mirror respectively, the reflected lights being returned to said optical system through said lens, said angular dispersion means, and said optical component,
   wherein the dispersion slope compensator includes a rotating stage having a stage surface and an axis, the stage surface is perpendicular to said first direction and mounts said three-dimensional mirror being placed on said linear-moving stage, the axis is parallel to said first direction and is located at a position where an intermediate-wavelength light signal included in said wavelength division multiplexing light is focused with said lens, and
   said rotating stage can adjust an angle of the reflection plane of said three-dimensional mirror with respect to optical axes of the light of each wavelength focused with said lens by rotating said stage surface about said axis by a rotating angle according to the chromatic dispersion compensation amount.

2. A dispersion slope compensator according to claim 1, wherein a distance between said angular dispersion means and said lens and a distance between said lens and the reflection plane of said three-dimensional mirror are configured to become a focal length of said lens respectively.

3. A dispersion slope compensator according to claim 1, wherein the rotating angle of said rotating stage is set such that return light loss to said optical system becomes the minimum for a peak wavelength of at least one light signal included in said wavelength division multiplexing light.

4. A dispersion slope compensator according to claim 1, wherein the rotating angle of said rotating stage is set such that the return light loss to said optical system becomes the minimum for at least one grid wavelength on a predetermined wavelength grid in which the plurality of light signals included in said wavelength division multiplexing light are arranged.

5. A dispersion slope compensator according to claim 1, wherein the rotating angle of said rotating stage is set such that an effective bandwidth of a transmission band corresponding to at least one light signal of a peak wavelength included in said wavelength division multiplexing light becomes the maximum.

6. A dispersion slope compensator according to claim 1, comprising:
   a monitor which detects a spectrum of return light to said optical system; and
   a means for performing feedback control of the rotating angle of said rotating stage based on the detection result of said monitor.

7. A dispersion slope compensator according to claim 1, wherein the angle at which the light of each wavelength outputted from said optical component are dispersed in said second direction is caused to be variable in said angular dispersion means.

* * * * *